United States Patent
Hattori et al.

(10) Patent No.: US 7,222,574 B2
(45) Date of Patent: May 29, 2007

(54) COMPOSITIONS AND METHOD FOR TREATING POTTED SEEDLINGS, AND METHOD FOR PLANTING SAME

(75) Inventors: Toshio Hattori, Tokyo (JP); Shigeo Sasaki, Tokyo (JP)

(73) Assignee: Dainichiseika Color & Chemicals Mfg. Co., Ltd., Tokyo (JP)

( * ) Notice: Subject to any disclaimer, the term of this patent is extended or adjusted under 35 U.S.C. 154(b) by 84 days.

(21) Appl. No.: 10/097,006

(22) Filed: Mar. 14, 2002

(65) Prior Publication Data

US 2002/0189512 A1 Dec. 19, 2002

(30) Foreign Application Priority Data

Apr. 2, 2001 (JP) .......................... 2001-103126

(51) Int. Cl.
*A01C 23/00* (2006.01)

(52) U.S. Cl. .................. 111/118; 111/200; 111/900

(58) Field of Classification Search ............... 514/341, 514/333, 336, 401, 402, 365; 546/276.1, 546/278.1, 256, 261, 262, 263; 548/202; 47/1.01 R, 62 N, 62 R, 57.5, 58.1, DIG. 9, 47/DIG. 10; 111/100, 118, 200, 900, 917, 111/915

See application file for complete search history.

(56) References Cited

U.S. PATENT DOCUMENTS

| 4,058,067 | A |   | 11/1977 | Wright et al. |
| 4,251,952 | A |   | 2/1981  | Porter et al. |
| 4,482,467 | A | * | 11/1984 | Nakamura et al. ............ 252/70 |
| 4,590,182 | A | * | 5/1986  | Haga et al. .................... 514/80 |
| 4,616,578 | A | * | 10/1986 | Talbott |
| 5,256,674 | A | * | 10/1993 | Haga et al. ................. 514/341 |
| 5,629,330 | A |   | 5/1997  | Greiner et al. |
| 6,199,318 | B1 |  | 3/2001  | Stewart et al. |

FOREIGN PATENT DOCUMENTS

| WO | WO 91/13844 | 9/1991 |
| WO | WO 95/19109 | 7/1995 |

* cited by examiner

*Primary Examiner*—Christopher J. Novosad
(74) *Attorney, Agent, or Firm*—Oblon, Spivak, McClelland, Maier & Neustadt, P.C.

(57) ABSTRACT

Treatment agents are provided for cell seedlings. Each treatment agent comprises water, a dispersant, and activated carbon finely dispersed with the dispersant in the water. Potted seedlings can be treated by dipping them in the treatment agent and/or by irrigating them with the treatment agent. In this manner, cell seedlings can be pre-treated before planting. The thus-planted seedlings may be irrigated with the treatment agent.

13 Claims, No Drawings

COMPOSITIONS AND METHOD FOR TREATING POTTED SEEDLINGS, AND METHOD FOR PLANTING SAME

BACKGROUND OF THE INVENTION

1. Field of the Invention

This invention relates to compositions and a method for treating potted seedlings and also to a method for planting the potted seedlings. These compositions and method are also useful for rearing vegetable seedlings healthily in nursing trays. It is to be noted that the term "potted seedlings" is used synonymously with the term "cell seedlings" or "cell mold seedlings" herein. Accordingly, these terms are interchangeable herein.

2. Description of the Related Art

Rearing of seedlings is extremely important in the cultivation of vegetables, flowers or ornamental plants. As is mentioned "Seedlings, fifty percent crop", whether or not seedlings are good until planting often governs the resulting crop yield and quality.

Each farm has conventionally reared seedlings by itself while making good use of its own experience and perception. Keeping in step with a recent decrease in successors and the resulting aging of those engaged in farming, however, specialization has advanced in farming because of the increasing trend that many farmers wish to be liberated from the irksomeness in rearing seedlings and to concentrate on cultivation. A great majority of farmers nowadays purchase seedlings and plant them, accordingly.

A variety of rearing methods have been investigated for seedlings. of these, rearing of seedlings in cells is about to become a principal rearing technique for seedlings for various reasons. Described specifically, a large number of seedlings can be reared under control without needing much labor. These seedlings are light in weight, so that they facilitate handling and provide excellent transportation convenience. Upon transplanting, they can be handled in much the same way as conventional seedlings with soil-covered roots, and permit mechanization of transplanting work.

"Cell seedlings" are regarded as one type of mold seedlings reared with their rhizosphere rendered identical in volume and shape by using containers or the like. The term "cell seedlings" as used herein, therefore, means seedlings the roots of which have been allowed to spread out through rhizosphere within "cells", which in turn mean small containers or compartments, such that the roots are molded within the cells as if potted.

In general, cell seedlings of a vegetable or the like are reared using cell trays in each of which a number of cells are connected together. In addition to the above-described meritorious features, cell seedlings also have other features advantageous for the systemization of rearing of seedlings such that the efficiency of production of seedlings per unit area is high and the use of seedlings with roots molded as if potted assures high efficiency in planting work such as transplanting while reducing transplanting injury.

As quality requirements for cell seedlings of vegetables or the like, they must be healthy, that is, their roots have grown sufficiently without spindly growth, and they can be expected to achieve sure rooting (establishment) and growth after transplanting.

SUMMARY OF THE INVENTION

The present inventors have proceeded with a variety of investigations to provide cell seedlings of the above-described quality. As a result, they have found that this object can be achieved by treating seedlings, which are under rearing in cells, with a treatment agent in which activated carbon is finely dispersed in water, leading to the completion of the present invention.

In one aspect of the present invention, there is thus provided a treatment agent for cell seedlings, which comprises water, a dispersant, and activated carbon finely dispersed with the dispersant in the water.

In another aspect of the present invention, there is also provided a method for treating cell seedlings, which comprises dipping the cell seedlings in the treatment agent and/or irrigating the cell seedlings with the treatment agent.

In a further aspect of the present invention, there is also provided a method for planting cell seedlings, which comprises pre-treating the cell seedlings by the treatment method. The thus-planted seedlings may be irrigated with the treatment agent.

The treatment agent and method according to the present invention allow cell seedlings, which are under rearing, to grow healthily and after planting, can promote their rooting and growth. The planting method according to the present invention can provide cell seedlings with good rooting and growth after planting.

DETAILED DESCRIPTION OF THE INVENTION AND PREFERRED EMBODIMENTS

The present invention will hereinafter be described in further detail.

Cell seedlings to which the present invention is applied are seedlings of vegetables, flowers or ornamental plants. No particular limitation is imposed on their species.

No particular limitation is imposed on the activated carbon employed in the treatment agent of the present invention for cell seedlings. Illustrative is one produced by carbonizing a raw material such as charcoal, wood, sawdust, animal bones, coconut shells or coal and activating the carbonized product with a chemical or steam. Also usable are those commercially available as powdered carbon, one obtained by grinding granular carbon, and fibrous carbon.

Activated carbon is porous carbon with a number of minute pores inside thereof, has a very large internal surface area, and is equipped with function to adsorb a variety of molecules. By attraction (van der Waales force) of carbon atoms inside the activated carbon, various molecules are adsorbed and held.

The treatment agent according to the present invention for cell seedlings of a vegetable or the like is a dispersion obtained by finely dispersing activated carbon with a dispersant in water. The content (concentration) of the activated carbon in the aqueous dispersion is not particularly limited, but may range from 1 to 50 wt. %, more preferably from 10 to 30 wt. % on the basis of the whole weight of the aqueous dispersion. If the content is lower than the above range, the treatment agent may achieve neither sufficient healthy growth [sufficient growth of roots and stems (without spindly growth)] of cell seedlings nor satisfactory post-planting rooting and growth. Even if the content is higher than the above range, on the other hand, the advantageous effects cannot be brought about as much as such a high content. Such a high content is not only uneconomical but also detrimental to the stability of the dispersion.

The activated carbon is dispersed with the dispersant in water. No particular limitation is imposed on the dispersant for use in the present invention, insofar as it is excellent in the dispersing effect for activated carbon and has no problem in safety and health. Examples of the dispersant can include, but are not limited to, anionic surfactants, cationic surfactants, nonionic surfactants, and silica sol. No particular limitation is imposed on the amount of the dispersant to be used, although it is preferred to use the dispersant in such an amount that its concentration in the dispersion falls within a range of from 0.01 to 20 wt. % (based on the whole weight of the aqueous dispersion). Upon treating cell seedlings, the treatment agent according to the present invention may be used after diluting it to an adequate concentration.

To disperse the activated carbon in water, a conventionally-known dispersing apparatus such as a beads mill or sand mill can be used. The activated carbon may preferably be dispersed such that their average particle size in the dispersion is reduced to 100 μm or smaller.

The treatment of cell seedlings with the aqueous dispersion of activated carbon can be performed, for example, by dipping the cell seedlings in the aqueous dispersion of activated carbon (hereinafter called "dipping"), irrigating the cell seedlings with the aqueous dispersion of activated carbon, or using these dipping and irrigation methods in combination. The treatment method is, however, not limited to these methods, and no particular limitation is imposed on the treatment method insofar as it can assure sufficient contact between roots of cell seedlings and the aqueous dispersion.

The treatment agent according to the present invention for cell seedlings is effective for the healthy growth of the cell seedlings (for the promotion of rooting, especially for the formation of many hairy and small roots) until planting and also for the promotion of rooting (establishment) and growth after planting.

Before planting, the treatment agent can be used, for example, by irrigating soil with it before seeding or irrigating the soil with it shortly after the seeding and further irrigating the soil with it as needed after the seeding until the planting Upon planting, it is preferred to plant the cell seedlings, for example, after dipping them in the treatment agent or irrigating the rhizosphere with the treatment agent. After planting, on the other hand, it is preferred to irrigate the treatment agent to planting furrows as needed.

The present invention will next be described more specifically based on Examples and Comparative Examples, in which all designations of "part" or "parts" and "%" are on a weight basis.

EXAMPLE 1 & COMPARATIVE EXAMPLE 1

Powdered activated carbon ("TAIKO ACTIVATED CARBON S", trade name; product of Futamura Chemical Industries Co., Ltd.) (25 parts), an anionic surfactant ("DEMOL P", trade name; product of Kao Corporation) (2.5 parts) and water (72.5 parts) were dispersed in a beads mill until the average particle size of the activated carbon was reduced to 10 μm or smaller. A cell seedling treatment agent A was obtained.

On Jun. 1, 1999, cell seedlings of asparagus (2-year-old seedlings reared in 9 cm pots were used) were treated by dipping them for 30 minutes in a treatment bath of a 25-fold dilution of the cell seedling treatment agent A, and were then pulled out of the treatment bath. Those treated cell seedlings were reared until Nov. 26, 1999. The results of a comparison in growth between the treated cell seedlings and untreated cell seedlings are presented as averages per seedling in Table 1.

TABLE 1

|  | Example | Comp. Ex. 1 |
| --- | --- | --- |
| Number of stems | 20.0 | 15.7 |
| Number of storage roots | 176 | 113 |
| Weight of subterranean part (g) | 663 | 357 |
| Number of small scales | 8.3 | 4.0 |

As is readily envisaged from Table 1, the growth of cell seedlings of asparagus is promoted by dipping treatment in an aqueous dispersion of activated carbon.

EXAMPLE 2 & COMPARATIVE EXAMPLE 2

On May 26, 2000, 2-year-old asparagus seedlings potted in 9 cm pots were dipped for 20 minutes in a 25-fold dilution of the cell seedling treatment agent A of Example 1 such that each seedling was soaked with 100 mL of the treatment solution, and the potted seedlings were then pulled out of the treatment solution. Shortly after that, they were planted in a field to be described below. For some of the seedlings so planted, the soil with the seedlings planted therein was irrigated with the above-described dilution (irrigated amount: 400 mL per seedling). 357 seedlings were planted as shown below.

| Details of treatment | Number of seedlings |
| --- | --- |
| Dipping treatment | 209 |
| Dipping treatment, and post-planting irrigation | 119 |
| Untreated | 29 |
| Total | 357 |

The cell seedlings treated as described above were planted at plant-missing points in a field of asparagus plants in the 6$^{th}$ years of open-field culture after planting (7 ares, inter-raw spacings: 1.8 m, in-raw spacings: 35 cm, missing plant rate: 33.2%). On Dec. 8, 2000, 10 plants in each experimental plot were examined at both aerial parts and subterranean parts thereof. The untreated seedlings were also planted and examined likewise. Experimental plots and details of the corresponding treatments are summarized in Table 2. The results are presented in Table 3.

TABLE 2

|  | Experimental plot | Details of treatment |
| --- | --- | --- |
| Ex. 2 | 1 | Dipping (shortly before planting) |
|  | 2 | Dipping (shortly before planting) |
|  | 3 | Dipping (shortly before planting) + Soil irrigation (after planting) |
|  | 4 | Dipping (shortly before planting) + Soil irrigation (after planting) |
| Comp. Ex. 2 | 1 | Untreated (irrigated with 400 mL water after planting) |
|  | 2 | Untreated (irrigated with 400 mL water after planting) |

TABLE 3

| | Experimental plot | Number of productive stems | Number of non-productive stems | Effective plant length (cm) | Weight of stems and sterns (g) | Dry weight of stems and sterns (g/plant) | Brix (%) | Weight of roots (g) |
|---|---|---|---|---|---|---|---|---|
| Sheltered cultivation | 1 | 1.9 | 15.9 | 120 | 100.0 | 84.0 | 20.1 | 676 |
| | 1* | 0.7 | 10.6 | 91 | 74.0 | 59.0 | 15.6 | 640 |
| Open-field cultivation | 2 | 2.0 | 10.1 | 101 | 41.0 | 30.0 | 16.9 | 232 |
| | 3 | 2.0 | 9.4 | 108 | 70.0 | 50.0 | 21.0 | 528 |
| | 4 | 2.4 | 8.7 | 112 | 50.0 | 35.0 | 17.4 | 276 |
| | 2* | 0.9 | 5.9 | 86 | 35.0 | 19.5 | 17.8 | 196 |

*Comparative Example

This application claims the priority of Japanese Patent Application 2001-103126 filed Apr. 2, 2001, which is incorporated herein by reference.

What is claimed is:

1. A method for treating cell seedlings, which comprises (1) dipping said cell seedlings in a treatment agent, (2) irrigating said cell seedlings with a treatment agent, or (3) dipping said cell seedlings in a treatment agent and irrigating said cell seedlings with said treatment agent, wherein said treatment agent comprises water, a dispersant, and activated carbon dispersed with said dispersant in said water.

2. A method for planting cell seedlings, which comprises pre-treating said cell seedlings by a treatment method as defined in claim 1.

3. A planting method according to claim 2, further comprising irrigating the thus-planted seedlings with a treatment agent comprising water, a dispersant, and activated carbon finely dispersed with said dispersant in said water.

4. The planting method according to claim 3, wherein the thus-planted seedlings are of asparagus.

5. Planted cell seedlings treated by the method according to claim 2.

6. The planted seedlings according to claim 5, which are of asparagus.

7. The method according to claim 2, wherein the cell seedlings are asparagus.

8. Cell seedlings treated by the method of claim 1.

9. The cell seedlings according to claim 8, which are of asparagus.

10. The method according to claim 1, wherein the cell seedlings are of asparagus.

11. A treatment agent for cell seedlings, consisting essentially of water, a dispersant, and activated carbon dispersed with said dispersant in said water.

12. Cell seedlings treated with the treatment agent comprising water, a dispersant, and activated carbon dispersed with said dispersant in said water.

13. The cell seedlings according to claim 12, which are of asparagus.

* * * * *